United States Patent [19]

Szostak

[11] 4,406,174
[45] Sep. 27, 1983

[54] NOISE REDUCING ARRANGEMENT FOR GEARS

[75] Inventor: Jan Szostak, Lincroft, N.J.

[73] Assignee: The Singer Company, Stamford, Conn.

[21] Appl. No.: 235,350

[22] Filed: Feb. 17, 1981

[51] Int. Cl.³ .................... F16H 55/20; D05B 57/14
[52] U.S. Cl. ............................. 74/409; 74/417; 112/184
[58] Field of Search ............... 112/163, 182, 184; 74/409, 417, 423, 424, 427

[56] References Cited

U.S. PATENT DOCUMENTS 1,810,204  6/1931  Dickson .
2,765,759  10/1956  Attwood et al. .
3,331,343  7/1967  Goebel et al. .................. 112/184 X
3,374,755  3/1968  Chaplin ............................ 112/184 x
3,395,661  8/1968  Creter .

FOREIGN PATENT DOCUMENTS 26777    10/1956  Fed. Rep. of Germany ........ 74/423
2027541  12/1970  Fed. Rep. of Germany ........ 74/427
2640737  3/1978   Fed. Rep. of Germany ........ 74/417
641100   7/1928   France ................................ 74/423
1325539  3/1963   France ................................ 74/423

Primary Examiner—Lawrence J. Staab
Attorney, Agent, or Firm—William V. Ebs; Robert E. Smith; Edward L. Bell

[57] ABSTRACT

The meshing bevel gears used to drive the vertical axis looptaker of a sewing machine are preloaded with a compressed resilient member which is prevented from deflecting to a position beyond its elastic limit during the running of the gears.

7 Claims, 3 Drawing Figures

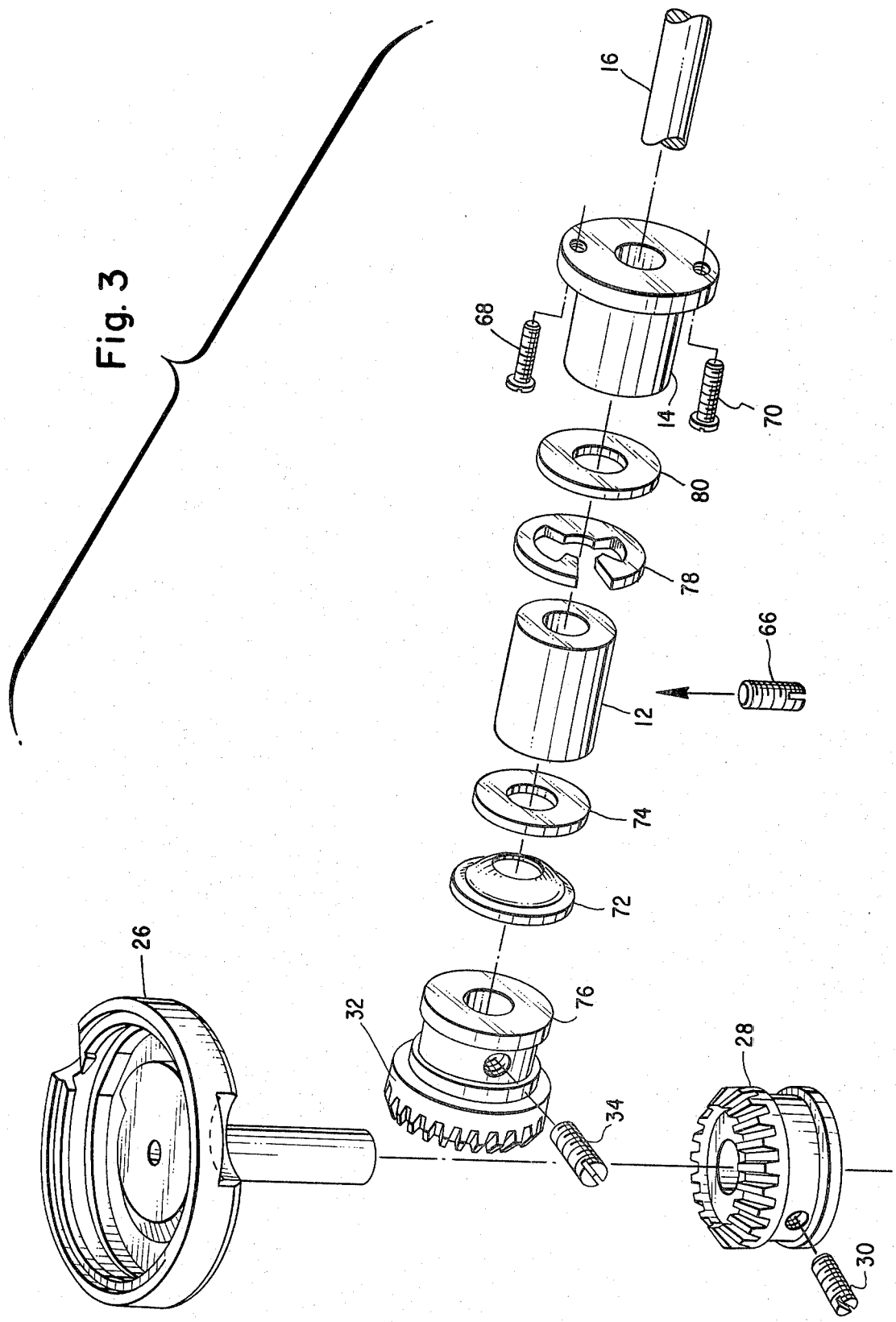

NOISE REDUCING ARRANGEMENT FOR GEARS

BACKGROUND OF THE INVENTION

1. Field of the Invention

The invention relates to means for reducing noise in meshing gears, especially meshing bevel gears in a sewing machine.

2. Description of the Prior Art

The meshing bevel gears used to drive the vertical axis looptaker of a sewing machine tend to be noisy, particularly at low speeds. In order to reduce the noise, a spring washer has been used to load the gears, and thereby take up any slack between them as well as cushion their engagement. The need for a critical setting of the gears during the manufacture of a machine is also eliminated when the gears were so loaded. While noise in the bevel gears is reduced with the spring washer, its working life has proved to be of short duration because of fatigue failure resulting from repeated deflections of the part during the running of the gears. It is a prime object of this invention to provide a durable noise reducing arrangement for bevel gears and associated parts.

It is another object of the invention to prevent fatigue failure in compressible resilient means used to preload meshing bevel gers in a noise reducing arrangement.

It is also an object of the invention to prevent a compressible resilient member used in preloading meshing bevel gears from deflecting beyond the elastic limit of the member during rotation of the gears.

It is yet another object of the invention to provide an improved noise reducing arrangement for bevel gears used in driving the vertical axis hook of a sewing machine.

Other objects and advantages of the invention will become apparent during a reading of the specification taken in connection with the accompanying drawings.

SUMMARY OF THE INVENTION

In accordance with the invention, a pair of meshing bevel gears are preloaded with a compressible resilient member which is initially deflected to a selected preloading position and which is prevented from deflecting to a position beyond the elastic limit of the member during the running of the gears. The compressible resilient member is located between one of the gears and an axially adjustable bushing for initially deflecting the resilient member to thereby bias the said one gear and shaft to which it is attached in the direction of the other gear. Suitable structure, preferably in the form of a member affixed to the shaft and located between the adjustable bushing and a fixed bushing is provided to limit movement of the shaft in the opposite direction, and so prevent deflections of the resilient member beyond its elastic limit as the gears rotate.

DESCRIPTION OF THE DRAWINGS

FIG. 3 is an exploded perspective view of the bevel gear noise reducing arrangement of the invention.

DESCRIPTION OF THE PREFERRED EMBODIMENT OF THE INVENTION

Figure 1:
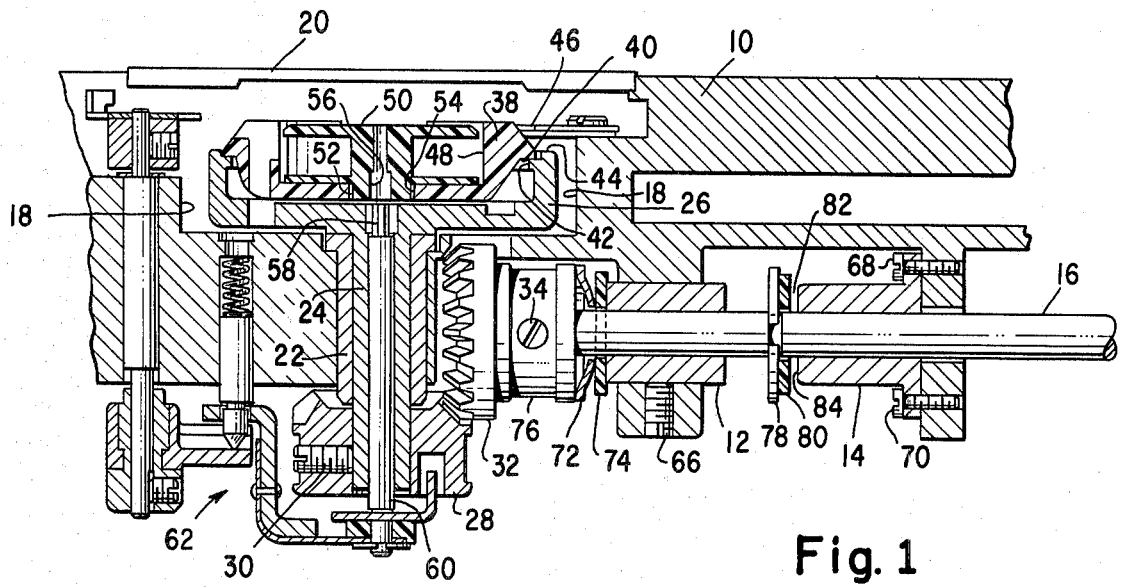
FIG. 1 is a sectional view taken lengthwise along a sewing machine bed through the rotational axis of a vertical axis looptaker and showing bevel driving gears therefor in a noise reducing arrangement according to the invention.
Figure 2:
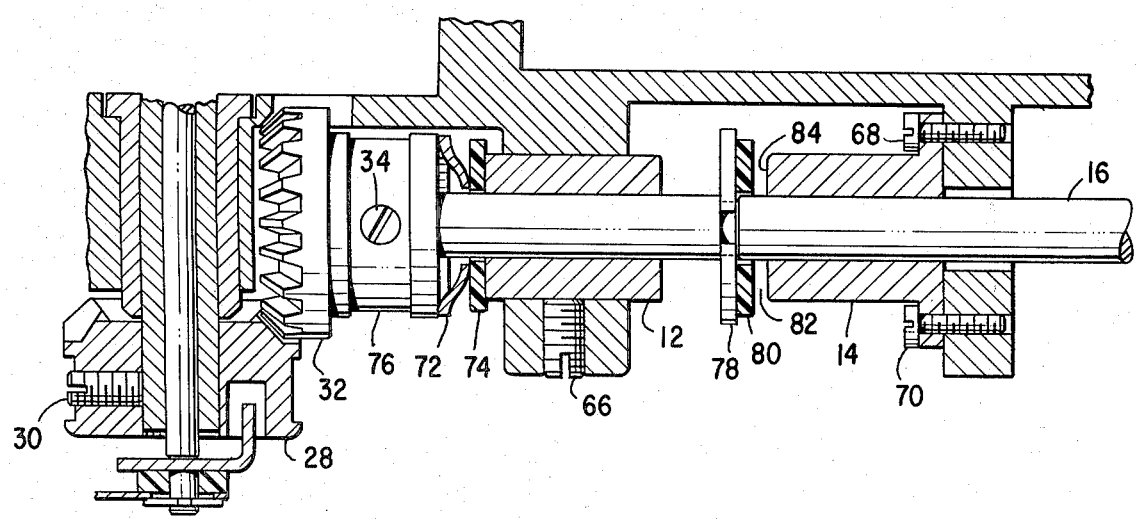
FIG. 2 is an enlarged fragmentary vertical sectional view taken along the axis of an input driving shaft having one of the looptaker gears and components of the noise reducing arrangement thereon.

Referring to the drawings, reference character 10 designates the bed of a sewing machine frame carrying bushings 12 and 14 in which a horizontal bed shaft 16 is journalled for rotation. As shown, the bed is formed with an upwardly open looptaker accommodating cavity 18 closed by a slide cover plate 20. Rotatable in a bushing 22 carried in the bed is a hollow looptaker shaft 24 which is attached by welding or the like to the underside of a rotary looptaker indicated generally at 26 which is disposed in the cavity 18. The looptaker is imparted turning movement in one direction during operation of the sewing machine by a bevel gear 28 made fast on the looptaker shaft by a set screw 30 and in mesh with a bevel gear 32 secured by a set screw 34 to the bed shaft 16. The bevel gears 28 and 32 are preloaded in a manner described hereinafter to reduce noise during their operation.

Constrained within the looptaker is a conventional bobbin case indicated generally at 38. As shown, the bobbin case is formed with a bearing flange 40 which rests upon a bearing rib 42 of the looptaker and is constrained radially against a bearing shoulder 44. The bobbin case is held down in the looptaker by a spring arm 46 and is prevented from rotation by suitable means (not shown).

Within a cavity 48 of the bobbin case there is shown a fully rotatable bobbin which is generally indicated at 50. The bobbin is formed with a depending boss 52 that fits into a central aperture 54 of the bobbin case. The boss 52 is formed with a hexagonal aperture 56 to match the hexagonal extremity 58 of a driving spindle 60 which may be raised to introduce extremity 58 into aperture 56 when it is desired to drive the bobbin to replenish thread thereon. The spindle is part of a bobbin thread replenishing mechanism generally indicated by reference character 62. Such bobbin thread replenishing mechanism does not form a direct part of the present invention and is therefore not described in further detail herein. A more detailed description may be found in U.S. Pat. No. 3,693,566 of Stanley J. Ketterer for "Bobbin Thread Replenishing Mechanism for Sewing Machines" issued Sept. 26, 1972.

As indicated hereinbefore, the bed shaft 16 is mounted for rotation in bushings 12 and 14. Bushing 12 can be axially adjusted to a selected position in the bed 10 of the machine and secured with a set screw 66, whereas the bushing 14 is permanently bolted to the bed as at 68 and 70. A compressible resilient member, shown as a beveled spring washer 72 in the drawings, is provided along with a plastic or steel washer 74, on the shaft 16 between the hub 76 of gear 32 and adjustable bushing 12. Between the bushings 12 and 14, shaft 16 carries a member 78 and a plastic washer 80. Member 78 is affixed to the shaft and may take the form of a tight fitting E-ring as depicted in FIG. 3 in the drawings, or it may be otherwise constructed. A shaft secured collar, for example, might be substituted for the E-ring.

Gears 28 and 32 are preloaded by moving bushing 12 against plastic washer 74 with a measured axial force to compress beveled resilient washer 72, and so force gear 32 against gear 28. The bushing 12 is secured in bed 10 with screw 66 when the gears have been preloaded with a predetermined force corresponding to a deflection of washer 72 well below its elastic limit as determined by the characteristics of the part. The washer 72 may further deflect during operation of the gears to cushion movements thereof, due, for example, to misalignment of their axes of rotation or other vibration producing causes. However, such further deflections are limited by an established relationship between member 78 and fixed bushing 14.

Member 78 is located on shaft 36 apart from the bushing 64 in the preloaded condition of the gears so as to establish a gap 82 which may be closed by rightward movement of the preloaded gear 32 and attached shaft 16 to bring washer 80 into engagement with the end surface 84 of bushing 14. The gap 82 is such as to cause washer 80 to engage bushing 14 and stop deflection of resilient washer 72 by gear hub 76 while such deflection is still within the elastic limit of washer 72. Preferably, the gap while normally sufficient for the cushioning of the bevel gears is such as to cause washer 72 to engage hub 76 while the deflection of the washer 72 is substantially below its elastic limit.

It is to be understood that the present disclosure relates to a preferred embodiment of the invention which is for purposes of illustration only and is not to be construed as a limitation of the invention. Numerous alterations and modifications of the structure therein will suggest themselves to those skilled in the art, and all such modifications and alterations which do not depart from the spirit and scope of the invention are intended to be included within the scope of the appended claims.

I claim:

1. In a sewing machine including a vertical axis looptaker and a drive train for rotating the looptaker, the said drive train comprising a pair of meshing bevel gears, a shaft on which one of the gears is affixed, an axially adjustable bushing wherein said shaft is rotatable and slidable, a compressed resilient member between said one gear and the axially adjustable bushing for biasing the said one gear and said shaft axially in the direction of the other gear to load the gears in accordance with the position of the axially adjustable bushing, a fixed bushing wherein said shaft is rotatable, and a member affixed to said shaft between the bushings in a position for limiting repetitive axial deflections of the resilient member caused by operation of the drive train to amplitudes within the elastic limit of the resilient member.

2. The combination of claim 1 wherein said compressed resilient member is a spring washer.

3. The combination of claim 1 wherein said fixed member is an E-ring.

4. The combination of claim 1 wherein said fixed member is a collar.

5. The combination of claim 1 wherein the said shaft is a substantially horizontal drive shaft.

6. The combination of claim 5 including a vertical axis shaft to which the said other gear is affixed and which extends therefrom to the looptaker.

7. The combination of claim 6 wherein the resilient member is deflectable between a gear loading position and a position limited by said fixed member only within the elastic limits of the said resilient member.

* * * * *